(12) United States Patent
Choi

(10) Patent No.: US 9,350,258 B2
(45) Date of Patent: May 24, 2016

(54) CONDUCTION DETECTING CIRCUIT, RECTIFYING SWITCH CONTROLLING CIRCUIT INCLUDING THE CONDUCTION DETECTING CIRCUIT AND POWER SUPPLY FOR THE RECTIFYING SWITCH CONTROLLING CIRCUIT TO BE APPLIED

(71) Applicant: FAIRCHILD KOREA SEMICONDUCTOR LTD., Bucheon-si (KR)

(72) Inventor: Hang-Seok Choi, Bedford, NH (US)

(73) Assignee: Fairchild Korea Semiconductor LTD (KR)

( * ) Notice: Subject to any disclaimer, the term of this patent is extended or adjusted under 35 U.S.C. 154(b) by 197 days.

(21) Appl. No.: 14/303,911

(22) Filed: Jun. 13, 2014

(65) Prior Publication Data

US 2015/0365006 A1    Dec. 17, 2015

(51) Int. Cl.
*H02M 3/335* (2006.01)

(52) U.S. Cl.
CPC ................................. *H02M 3/33592* (2013.01)

(58) Field of Classification Search
CPC .................................................. H02M 3/33592
See application file for complete search history.

(56) References Cited

U.S. PATENT DOCUMENTS

| | | | |
|---|---|---|---|
| 6,101,104 A | 8/2000 | Eng | |
| 6,128,206 A | 10/2000 | Sun et al. | |
| 6,396,250 B1 | 5/2002 | Bridge | |
| 6,426,884 B1 * | 7/2002 | Sun | H02M 3/33592 363/127 |
| 6,535,400 B2 | 3/2003 | Bridge | |
| 6,906,500 B2 | 6/2005 | Kernahan | |
| 7,095,220 B2 | 8/2006 | Kernahan | |
| 7,599,198 B2 * | 10/2009 | Tao | H02M 3/33592 363/21.03 |
| 8,134,851 B2 | 3/2012 | Soldano et al. | |
| 8,164,391 B2 | 4/2012 | Huynh | |
| 8,400,787 B2 | 3/2013 | Wu et al. | |
| 9,071,155 B2 * | 6/2015 | Uno | H02M 3/33561 |
| 2004/0109335 A1 * | 6/2004 | Gan | H02M 3/33592 363/127 |
| 2006/0187686 A1 * | 8/2006 | Sun | H02M 3/33592 363/17 |
| 2007/0008757 A1 * | 1/2007 | Usui | H02M 3/33592 363/21.06 |
| 2009/0161396 A1 * | 6/2009 | Lin | H02M 3/33592 363/125 |
| 2010/0103710 A1 * | 4/2010 | Reddy | H02M 3/33592 363/127 |
| 2010/0188871 A1 | 7/2010 | Kim et al. | |
| 2012/0163038 A1 | 6/2012 | Park et al. | |

OTHER PUBLICATIONS

Fairchild Semiconductor, FAN6208 Secondary-Side Synchronous Rectifier Controller for LLC Topology, Nov. 2010, 18 pages.

* cited by examiner

*Primary Examiner* — Jue Zhang
(74) *Attorney, Agent, or Firm* — Grossman Tucker Perreault & Pfleger PLLC

(57) ABSTRACT

A circuit configured to detect the conduction of a first body diode and a second body diode of the first and second synchronous rectification transistors is provided. The circuit includes a low-pass filter configured to generate a filtered voltage by receiving a detection voltage based on a drain voltage of the first synchronous rectification transistor and low-pass filtering the received drain voltage, a first comparator configured to compare whether the filtered voltage is higher than the detection voltage, and a second comparator configured to compare whether the detection voltage is higher than the filtered voltage. A time point of ending a first synchronous rectification conduction interval of the first body diode and a time point of a second synchronous rectification conduction interval of the second body diode are determined, according to outputs from the first and second comparators.

20 Claims, 7 Drawing Sheets

CONDUCTION DETECTING CIRCUIT, RECTIFYING SWITCH CONTROLLING CIRCUIT INCLUDING THE CONDUCTION DETECTING CIRCUIT AND POWER SUPPLY FOR THE RECTIFYING SWITCH CONTROLLING CIRCUIT TO BE APPLIED

TECHNICAL FIELD

The present disclosure is related to a conduction detecting circuit, a rectifying switch controlling circuit that may include the conduction detecting circuit, and a power supply to which the rectifying switch controlling circuit may be applied.

BACKGROUND

Rectification using a diode may lead to power loss due to a forwarding voltage of the diode. To reduce the power loss, a switching operation of a synchronous rectification MOSFET including a body diode may be used.

Ideally, rectification using a synchronous rectification MOSFET includes detecting conduction of a body diode, turning on the synchronous rectification MOSFET connected to the conducting body diode, and turning off the synchronous rectification MOSFET before the body diode becomes blocked. Thus, it is important to control the switch timing of the synchronous rectification MOSEFET. However, accurately anticipating the turn-off time of the synchronous rectification MOSFET is not easy.

Even if the synchronous rectification MOSFET is turned off when electric currents flowing through the synchronous rectification MOSFET are detected and become zero current, it is still difficult to accurately detect the current flowing through the synchronous rectification MOSFET. This is because On resistance of the synchronous rectification MOSFET is very low, and thus, the current is weak with respect to noise and is likely to be distorted.

SUMMARY

Consistent with the present disclosure, an example conduction detecting circuit may be capable of detecting conduction in a synchronous rectification transistor without being influenced by noise. An example power supply may comprise a rectifying switch controlling circuit that may include a conduction detecting circuit.

In one embodiment, a conduction detection circuit may detect each conduction of a first body diode connected in parallel to a first synchronous rectification transistor which is connected to one end of a first winding, and conduction of a second body diode connected in parallel to a second synchronous rectification transistor which is connected to one end of a second winding.

The conduction detection circuit may include a low-pass filter configured to generate a filtered voltage by receiving a detection voltage based on a drain voltage of the first synchronous rectification transistor, a first comparator configured to detect a time point at which the detection voltage decreases to be lower than the filtered voltage by at least a first reference voltage, and a second comparator configured to detect a time point at which the detection voltage increases to be higher than the filtered voltage by at least a second reference voltage.

The conduction detection circuit may determine a time point of ending a first synchronous rectification conduction interval of the first body diode and a time point of ending second synchronous rectification conduction interval of the second body diode, according to outputs from the first and second comparators.

The conduction detection circuit may determine the time point of ending the first synchronous rectification conduction interval based on the output from the second comparator when the detection voltage is higher than the filtered voltage by at least the second reference voltage.

The conduction detection circuit may determine the time point of ending the second synchronous rectification conduction interval based on the output from the first comparator when the detection voltage is lower than the filtered voltage by at least the first reference voltage.

The conduction detection circuit may further include a third comparator configured to compare to determine whether the detection voltage is higher than a predetermined reference voltage or not.

The conduction detection circuit may further include an SR flip-flop configured to generate an enable level of output signal according to the output from the second comparator, and generate an enable level of inverted output signal according to the output from the first comparator.

The conduction detection circuit may further include a first logic operator configured to generate a first OFF signal, indicating a time point of ending the first synchronous rectification conduction interval according to an output signal from the SR flip-flop, when the detection voltage is higher than a predetermined reference voltage.

The conduction detection circuit may further include a second logic operator configured to generate a second OFF signal, indicating a time point of ending the second synchronous rectification conduction interval according to an inverted output signal from the SR flip-flop and an inverted signal of the first OFF signal.

The low-pass filter may include a resistor including an end connected to the detection voltage, and a capacitor connected to the other end of the resistor, wherein the filtered voltage may be a voltage from where the resistor connects to the capacitor.

In one embodiment, a rectification switch control circuit may control a switching operation of a first synchronous rectification transistor and a second synchronous rectification transistor connected in parallel to a first body diode and a second body diode, respectively, which conduct according to a resonance current under control of switching operations of a first switch and a second switch.

The rectification switch control circuit may include a conduction detection circuit configured to detect a time point of ending a first synchronous rectification conduction interval of the first body diode and a time point of ending a second synchronous rectification conduction interval of the second body diode using a detection voltage corresponding to a drain voltage of the first synchronous rectification transistor and a filtered voltage generated by a low pass filter configured to filter the detection voltage, and an edge trigger configured to generate a first edge signal at a turn-on time of the first switch and generate a second edge signal at a turn-on time of the second switch.

A time point of beginning the first synchronous rectification conduction interval may be in synchronization with the first edge signal, and a time point of beginning the second synchronous rectification conduction interval may be in synchronization with the second edge signal.

The rectification switch control circuit may turn on the first synchronous rectification transistor when the first switch turns on and the detection voltage is rapidly falling, and may turn off the first synchronous rectification transistor when a predetermined ON period elapses from the turn-on time. A period obtained by subtracting a predetermined period from the first synchronous rectification conduction interval in an immediately-preceding switching period of the first synchronous rectification transistor may be set as the predetermined ON period.

The rectification switch control circuit may turn on the second synchronous rectification transistor when the second switch is turned on and the detection voltage is rapidly rising, and may turn off the second synchronous rectification transistor when a predetermined ON period elapses from the turn-on time. A period obtained by subtracting a predetermined period from the second synchronous rectification conduction interval in an immediately-preceding switching period of the second synchronous rectification transistor may be set as the predetermined ON period.

The conduction detection circuit may determine a time point of ending the second synchronous rectification conduction interval when the detection voltage is lower than the filtered voltage by at least a first reference voltage, and may determine a time point of ending the first synchronous rectification conduction interval when the detection voltage is higher than the filtered voltage by at least a second reference voltage.

The conduction detection circuit may include a first comparator configured to determine if the detection voltage is lower than the filtered voltage by at least the first reference voltage, a second comparator configured to determine if the detection voltage is higher than the filtered voltage by at least the second reference voltage, and an SR flip-flop configured to generate an enable level of output signal according to an output from the second comparator and generate an enable level of inverted output signal according to an output from the first comparator.

The conduction detection circuit may generate a first OFF signal indicating a time point of ending the first synchronous rectification conduction interval according to an output signal from the SR flip-flop, and generate a second OFF signal, indicating a time point of ending the second synchronous rectification conduction interval according to an inverted signal of the first OFF signal and an inverted output signal from the SR flip-flop.

The edge trigger may be in synchronization with the time point of ending the first synchronous rectification conduction interval to generate a third edge signal, and be in synchronization with the time point of ending the second synchronous rectification conduction interval to generate a fourth edge signal.

The rectification switch control circuit may further include a first SR flip-flop configured to generate an enable level of a first synchronous rectification conduction signal according to the first edge signal and generate a disable level of a first synchronous rectification conduction signal according to the third edge signal, and a second SR flip-flop configured to generate an enable level of a second synchronous rectification conduction signal according to the second edge signal and generate a disable level of a second synchronous rectification conduction signal according to the fourth edge signal.

The rectification switch control circuit may count the first and second synchronous rectification conduction intervals using the first and second synchronous rectification conduction signals, respectively.

The edge trigger may include a delayer configured to delay an input signal for a predetermined delay time before outputting the same, an inverter configured to invert an output from the delayer, and an AND gate configured to perform AND operation of the input signal and an output from the inverter.

The input signal may be a gate voltage of the first switch or a gate voltage of the second switch.

In one embodiment, a power supply may include a first switch, a second switch connected to one end of the first switch, a primary side winding connected to one end of the first switch, a first body diode connected to one end of a first winding of a secondary side, a second body diode connected to one end of a second winding whose second end is connected to the other end of the first winding of the secondary side, a first synchronous rectification transistor connected in parallel to the first body diode, and a second synchronous rectification transistor connected in parallel to the second body diode.

The power supply may detect a time point of ending the first synchronous rectification conduction interval of the first body diode and a time point of ending the second synchronous rectification conduction interval of the second body diode, using detection voltage corresponding to a drain voltage of the first synchronous rectification transistor and a filtered voltage generated by a low-pass filter configured to filter the detection voltage.

A time point of beginning the first synchronous rectification conduction interval may be in synchronization with the turn-on time of the first switch, and a time point of beginning the second synchronous rectification conduction interval may be in synchronization with the turn-on time of the second switch.

The power supply may determine a time point of ending the second synchronous rectification conduction interval when the detection voltage is lower than the filtered voltage by at least a first reference voltage, and may determine a time point of ending the first synchronous rectification conduction interval when the detection voltage is higher than the filtered voltage by at least a second reference voltage.

According to embodiments of the present inventions, a conduction detecting circuit which is capable of detecting conduction of a synchronous rectification transistor without the influence of noise, a rectification switch control circuit having the same, and a power supply implementing the rectification switch control circuit.

DETAILED DESCRIPTION

Figure 1:
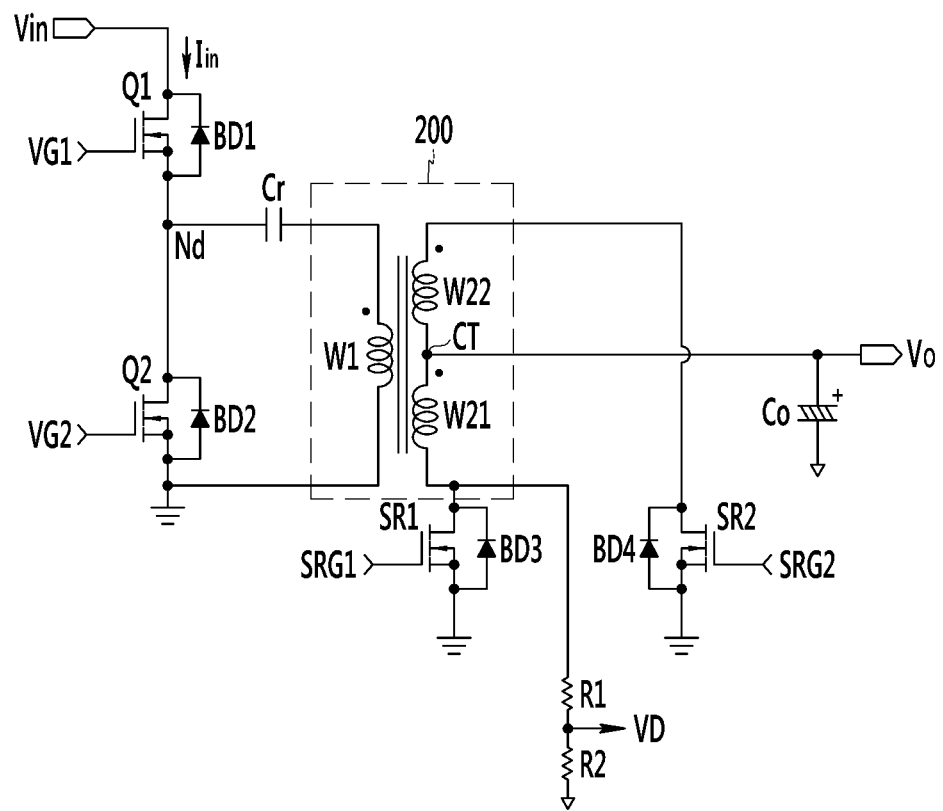
FIG. 1 illustrates an example power supply according to an embodiment.

The present disclosure will be explained in detail below with reference to the drawings to assist those skilled in the pertinent art to easily comprehend various embodiments disclosed herein. However, the disclosed embodiments may be implemented in a variety of forms even without the configurations specifically defined in the drawings. Well-known functions and/or constructions have not been described in detail herein since they would obscure the disclosure with unnecessary detail. Also for the sake of clarity, the same drawing reference numerals have been used to identify the same elements throughout the drawings.

Throughout the disclosure, when an element is described as being "connected" to another element, this connection encompasses not only "direct connection", but also "electrical connection" with another element interposed in between. Further, when an object is described as "comprising" an element, unless specified otherwise, this means that the object may include yet other element(s) rather than exclusively including only the specific element.

In one embodiment, it may be possible to predict a turn-off time of a synchronous rectification transistor based on a switching time of an immediately-preceding switching period. When the body diode of the synchronous rectification transistor begins to conduct, a drain-source voltage of the synchronous rectification transistor drops to a predetermined turn-on detecting threshold voltage. At this time, the synchronous rectification transistor may be turned on. The synchronous rectification transistor may be turned off before the electric current flowing through the synchronous rectification transistor becomes zero, and current then flows through the body diode. When the body diode stops conducting due to resonance currents, the drain-source voltage of the synchronous rectification transistor may increase to a preset turn-off detecting threshold voltage.

In one embodiment, the synchronous rectification conduction interval may span between conduction of the body diode and cut off of the body diode. The synchronous rectification conduction intervals of each of the two adjacent switching periods may be substantially identical. The ON-period of the current switching period may be predicted by subtracting a predetermined time from the synchronous rectification conduction interval as detected during the immediately-preceding switching period, and the synchronous rectification transistor may be turned off after an ON-period elapses since the turn-on time.

In one embodiment, the synchronous rectification conduction time may be determined using a drain-source voltage of one of the two synchronous rectification transistors. To be specific, the synchronous rectification transistor may be used to determine a drain-source voltage (e.g., or a voltage corresponding to a drain-source voltage, such as a resistance-divided voltage from a drain-source voltage), low-pass filtered voltage of the drain-source voltage (e.g., or a corresponding voltage) and an end time of the synchronous rectification conduction interval using the difference between the two voltages. A circuit to control switching operations of the synchronous rectification transistors according to embodiments and a power supply having the same will now be explained by referring to certain embodiments and accompanying drawings.

FIG. 1 illustrates a power supply according to an embodiment. Referring to FIG. 1, the power supply may be implemented as a half-bridge LLC resonance direct current (DC) to DC (DC/DC) converter (hereafter, "converter"), but is not limited to any specific converter type. For convenience of explanation about switching control of the synchronous rectification transistor, the half-bridge LLC resonance converter will be explained only for illustrative purposes. The power supply in FIG. 1 includes a second switch Q2, a first switch Q1, a transformer 200, a first synchronous rectification transistor SR1, and a second synchronous rectification transistor SR2. Body diodes BD2, BD1 may be formed between each of the drains and sources of the second switch Q2 and the first switch Q1, respectively. The first and second switches Q1, Q2 may be connected in a series between an input voltage Vin and a primary side ground, and alternately switch, respectively. The first switch Q1 may turn off and the second switch Q2 may turn on after a first dead time, and the second switch Q2 may turn off and the first switch Q1 may turn on after a second dead time.

The drain of the first switch Q1 may be connected to the input voltage Vin, the source of the first switch Q1 and the drain of the second switch Q2 may be connected at a node Nd, and the source of the second switch Q2 may be connected to the primary side ground. Gate voltages VG1, VG2 may be supplied to the respective gates of the first and second switches Q1, Q2. The second and first switches Q2, Q1 switch by turns, and power supply from a primary side to a secondary side is controlled according to a primary side winding switching operation. For example, power supply may increase as the switching frequencies of the second and first switches Q2, Q1 decrease, while power supply may decrease as the switching frequencies increase.

Between the input voltage Vin and the node Nd, the capacitor Cr, and the primary side winding W1 of the transformer 20 may be connected in a series. Resonance occurs between the magnetizing inductance and the leakage inductance formed on the primary side of the transformer 200 and the capacitor Cr, and an electric current Iin supplied into the primary side may take the form of sine waves due to the resonance. Hereafter, the electric current Iin will be referred to as resonance current. Although not illustrated in FIG. 1, an inductor may be additionally provided between the node Nd and the primary side ground. The flow of the resonance current Iin may be controlled by the switching operation of the first and second switches Q1, Q2, and the first and second switches Q1, Q2 may be controlled to be zero-voltage switched based on the resonance current Iin flow.

The secondary side winding of the transformer 200 differentiates a winding W21 and a winding W22 with reference to a center tab CT. The secondary side windings W21, W22 may be insulation-coupled with the primary side winding W11 at a predetermined winding ratio. One end of the secondary side winding W21 may be connected with the first synchronous rectification transistor SR1, and a body diode BD3 may be formed between the drain and source of the primary synchronous rectification transistor SR1. One end of the secondary side winding W22 may be connected with the second synchronous rectification transistor SR2, and a body diode BD4 may be formed between the drain and source of the secondary synchronous rectification transistor SR2. The source of the primary synchronous rectification transistor SR1 may be connected to the secondary side ground, the drain may be connected to one end of the secondary side winding W21, and the gate may receive gate voltage SRG1 input. The source of the secondary synchronous rectification transistor SR2 may be connected to the secondary side ground, the drain may be connected to one end of the secondary side winding W22, and the gate may receive gate voltage SRG2 input. The capacitor Co may be connected between the center tab CT and the secondary side ground. Output voltage Vo may be generated as the electric current flowing through the secondary winding W21 is rectified through the primary synchronous rectification transistor SR1 and flows to the capacitor Co, while the current flowing through the secondary side winding W22 is rectified through the second synchronous rectification transistor SR2 and flows to the capacitor Co.

Referring to FIG. 1, resistors R1, R2 may be connected in a series between the drain of the first synchronous rectification transistor SR1 and the secondary side ground. In one embodiment, it may be possible to predict turn-off time of the first and second synchronous rectification transistors SR1, SR2 using voltage VD at a node that connects the two resistors R1, R2. The turn-off time of the first synchronous rectification transistor SR1 (or second synchronous rectification transistor SR2) may be determined based on a counting result of the synchronous rectification conduction interval in the immediately-preceding switching period of the first synchronous rectification transistor SR1 (or SR2). In one embodiment, the synchronous rectification conduction interval may be set to span between switching at the primary side and rapid increase of the detection voltage VD. The turn-on time of the first synchronous rectification transistor SR1 (or second synchronous rectification transistor SR2) may be determined based on the conduction time of the body diode BD3 (or body diode BD4). Alternatively, it may be possible to determine the turn-on time of the first synchronous rectification transistor SR1 according to the conduction time of the primary side first switch Q1, and determine the turn-on time of the second synchronous rectification transistor SR2 according to the conduction time of the primary side second switch Q2. When the primary side first switch Q1 turns on, the body diode BD3 conducts due to the resonance current which flows in the first switch Q1. The conduction time of the body diode BD3 substantially corresponds to the turn-on time of the first switch Q1. Accordingly, in one embodiment, the conduction time of the body diode BD3 may be the turn-on time of the first switch Q1. Likewise, the conduction time of the body diode BD4 may be the turn-on time of the second switch.

After the predicted ON-time from the conduction of the body diode BD3 (or BD4) elapses, the first synchronous rectification transistor SR1 may turn off. After that, as the current flowing in the body diode BD3 (or BD4) decreases to 0, the body diode BD3 (or BD4) blocks the backward current and the voltages on both sides of the diodes begins to rise. The detection voltage VD rapidly increases when the body diode BD3 blocks the backward current. Accordingly, it may be possible to detect the end time of the synchronous rectification conduction, using the rapidly-varying detection voltage VD. For the initial duration that the body diodes BD3, BD4 are initially conducting in accordance with the primary side switching operation, the first and second synchronous rectification transistors SR1, SR2 are turned on, and the synchronous rectification conduction intervals, e.g., the conduction intervals of the body diodes BD3 and BD4, are respectively detected. After the initial duration, the first synchronous rectification transistor SR1 may then turn on in synchronization with the turn-on time of the first switch Q1 and remains ON during the ON time which is the result of subtracting a predetermined time from the detected synchronous rectification conduction interval. The first synchronous rectification transistor SR1 may turn off when the ON time elapses. After that the body diode BD3 blocks the backward current, causing high voltages at both sides and the detection voltage VD to increase. The synchronous rectification time in the current switching period of the first synchronous rectification transistor SR1 may have a duration corresponding to the time between the turn-on of the first switch Q1 and the rapid increase of the detection voltage VD. The above-mentioned operation may then reiterate and switching operation of the second synchronous rectification transistor SR2 may be controlled in the same manner. By flipping the drain-source voltage of the first synchronous rectification transistor SR1 with reference to a predetermined center voltage, the flipped drain-source voltage of the first synchronous rectification transistor SR1 may become the drain-source voltage of the second synchronous rectification transistor SR2. Accordingly, when one of the two voltages is measured, the other may be predicted. In one embodiment, the detection voltage VD may be used, which is the result of the resistance distribution of the drain voltage of the first synchronous rectification transistor SR1. Because the source is connected to the secondary side ground, the drain-source voltage and the drain voltage are uniform.

Figure 2:
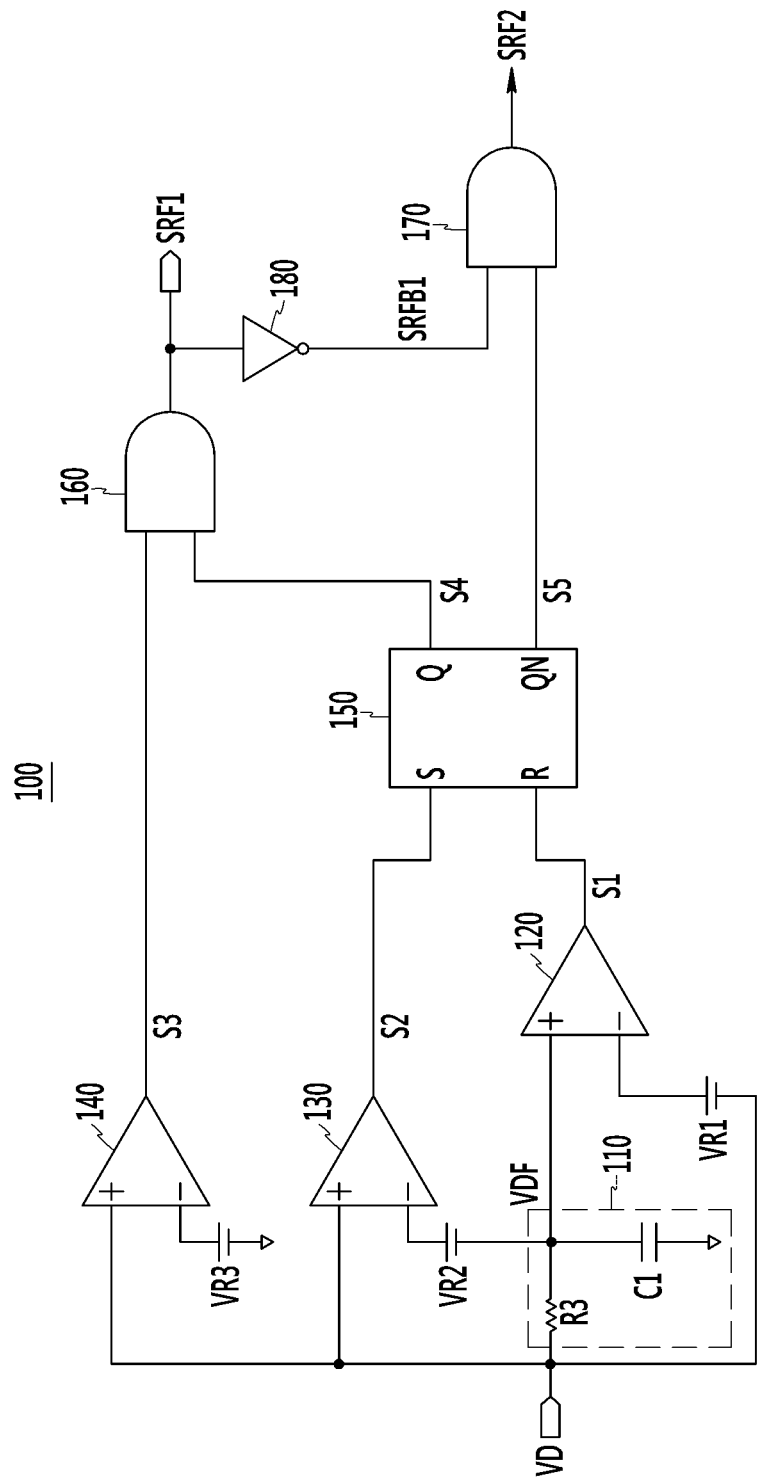
FIG. 2 illustrates an example circuit for detecting a synchronous rectification conduction interval.

FIG. 2 illustrates a circuit to detect a synchronous rectification conduction interval. An embodiment is not limited to the circuit (hereafter, 'conduction detection circuit") of FIG. 2 only. The conduction detection circuit 100 may detect the end time of the first synchronous rectification conduction interval and the end time of the second synchronous rectification conduction interval, based on the result of comparing the detection voltage VD and the filtered voltage VDF obtained by filtering the detection voltage VD (e.g., using a low-pass filter). In one embodiment, the first synchronous rectification conduction interval may correspond to the conduction interval of the body diode BD3, and may be set to a period spanning between a time point of rapid fall of the detection voltage VD by the conduction of the body diode BD3 and a time point of rapid rise of the detection voltage VD by the blocking of the body diode BD3. The second synchronous rectification conduction interval may correspond to the conduction interval of the body diode BD4, and may be set to a period spanning between a time point of rapid rise of the detection voltage VD by the blocking of the body diode BD3 and a time point of rapid fall of the detection voltage VD by the blocking of the body diode BD3.

Because the drain voltage of the first synchronous rectification transistor SR1 becomes the drain voltage of the second synchronous rectification transistor SR2 when the drain voltage of the first synchronous rectification transistor SR1 is flipped, the time point of rapid fall of the detection voltage VD may correspond to the time point of rapid rise of the drain voltage of the second synchronous rectification transistor SR2 (e.g., to the time point when the body diode BD4 is blocked). On the contrary, the time point of rapid rise of the detection voltage VD may correspond to the time point of rapid fall of the drain voltage of the second synchronous rectification transistor SR2 (e.g., to the time point when the body diode BD4 is blocked). In one embodiment, low pass filtering may be used to detect the time points of rapid rise and fall of the detection voltage VD. For the duration of rapid rising of the detection voltage VD, the voltage from the low-pass filtered detection voltage VD may rise with a lower slope than that of the detection voltage VD. Accordingly, the detection voltage VD may be higher than the low-pass filtered voltage for the duration of rapid rising of the detection voltage VD. For the duration of rapid falling of the detection voltage VD, the voltage from the low-pass filtered detection voltage VD may decrease with a lower slope than that of the detection voltage VD. Accordingly, the detection voltage VD may be lower than the low-pass filtered voltage for the duration of rapid falling of the detection voltage VD. It is thus possible that the conduction detection circuit 100 may detect the end of the second synchronous rectification conduction interval when the filtered voltage VDF is higher than the detection voltage VD by a predetermined first reference voltage VR1. Further, the conduction detection circuit 100 may detect the end of the first synchronous rectification conduction interval when the detection voltage VD is higher than the filtered voltage VDF by a predetermined second reference voltage VR2.

Referring to FIG. 2, the conduction detection circuit 100 may include, for example, a low-pass filter 110, first to third comparators 120-140, a SR flip-flop 150, a first logic gate 160, a second logic gate 170 and an inverter 180. The low-pass filter 110 may include a capacitor C1 and a resistor R3. One end of the resistor R3 may be connected with the detection voltage VD, while the other end of the resistor R3 may be connected to one electrode of the capacitor C1. The other electrode of the capacitor C1 may be connected to the secondary side ground. The filtered voltage (VDF) may occur at a node where the resistor R3 connects to the capacitor C1. When the detection voltage VD drops, the first comparator 120 may detect the time point at which the detection voltage VD drops below the filtered voltage VDF by more than a predetermined value. For example, the first comparator 120 may include a non-inverting terminal (+) to receive filtered voltage VDF and an inverting terminal (−) to receive voltage to which a first reference voltage VR1 corresponding to a predetermined value of detection voltage VD is added, and may generate a high level of first comparison signal S1 when the input to the non-inverting terminal (+) is equal to, or above the input to the inverting terminal (−). In an opposite example, the first comparator 120 may generate a low level of the first comparison signal S1. When the detection voltage VD rises, the second comparator 130 may detect the time point at which the detection voltage VD rises above the filtered voltage VDF by more than a predetermined value. For example, the second comparator 130 may include a non-inverting terminal (+) to receive the detection voltage VD and an inverting terminal (−) to receive voltage to which a second reference voltage VR2 corresponding to a predetermined value of filtered voltage VDF is added, and generates a high level of second comparison signal S2 when the input to the non-inverting terminal (+) is equal to, or above the input to the inverting terminal (−). In an opposite example, the second comparator 130 may generate a low level of the second comparison signal S2. The third comparator 140 may include a non-inverting terminal (+) to receive the detection voltage VD and an inverting terminal (−) to receive a third reference voltage VR3, and generates a high level of the third comparison signal S3 when the input to the non-inverting terminal (+) is equal to, or above the input to the inverting terminal (−). In an opposite example, the third comparator 140 may generate a low level of the third comparison signal S3. The third reference voltage VR3 may be set to such a level that can detect rise of the drain voltage of the first synchronous rectification transistor SR1 in accordance with the blocking of the body diode BD3.

The SR flip-flop 150 may include a reset R to receive the first comparison signal S1, a set S to receive the second comparison signal S2, an output Q and an inverting output QN. When the input to the set S of the SR flip-flop 150 is at a high level, a high level of output signal S4 may be outputted through the output Q, and a low level of inverted output signal S5 may be outputted through the inverting output QN. When the input to the reset R of the SR flip-flop 150 is at a high level, a low level of output signal S4 maybe outputted through the output Q, and a high level of the inverted output signal S5 may be outputted through the inverting output QN. The first logic gate 160 generates a first OFF signal SRF1 as a result of AND operation of incoming signals S3, S4. When both the third comparison signal S3 and the output signal S4 are at high levels, the first logic gate 160 may generate a high level of the first OFF signal SRF1, indicating the end of the first synchronous rectification conduction interval. The inverter 180 may then invert the first OFF signal SRF1 and generates a first inverted OFF signal SRFB1. The second logic gate 170 generates a second OFF signal SRF2 as a result of AND operation of incoming signals SRFB1, S5. When both the first inverted OFF signal SRFB1 and the inverted output signal S5 are at high levels, the second logic gate 170 may generate a high level of the second OFF signal SRF2, indicating the end of the second synchronous rectification conduction interval. When the detection voltage VD rapidly rises in accordance with the blocking of the body diode BD3, the detection voltage VD may become higher than the filtered voltage VDF. The second comparator 130 may then generate a high level of the second comparison signal S2, the third comparator 140 may generate a high level of the third comparison signal S3, and the first comparator 120 may generate a low level of the first comparison signal S1. Accordingly, the output signal S4 may be at a high level, causing the first OFF signal SRF1 to be high level. The first inverted OFF signal SRFB1 may then be at a low level and, because the output signal S5 also is low level, the second OFF signal SRF2 becomes a low level.

When the detection voltage VD rapidly falls in accordance with body diode BD3 conducting, the filtered voltage VDF may become higher than the detection voltage VD. The first comparator 120 may then generate a high level of the first comparison signal S1, the third comparator 140 may generate a low level of the third comparison signal S3, and the second comparator 130 may generate a low level of the second comparison signal S2. Accordingly, the output signal S4 and the third comparison signal S3 may go low, causing the first OFF signal SRF1 to also be at a low level. The first inverted OFF signal SRFB1 may then be at a high level and, because the output signal S5 also is high level, the second OFF signal SRF2 may also be generated at a high level. The first and second synchronous rectification conduction intervals may be detected in this manner.

Figure 3:
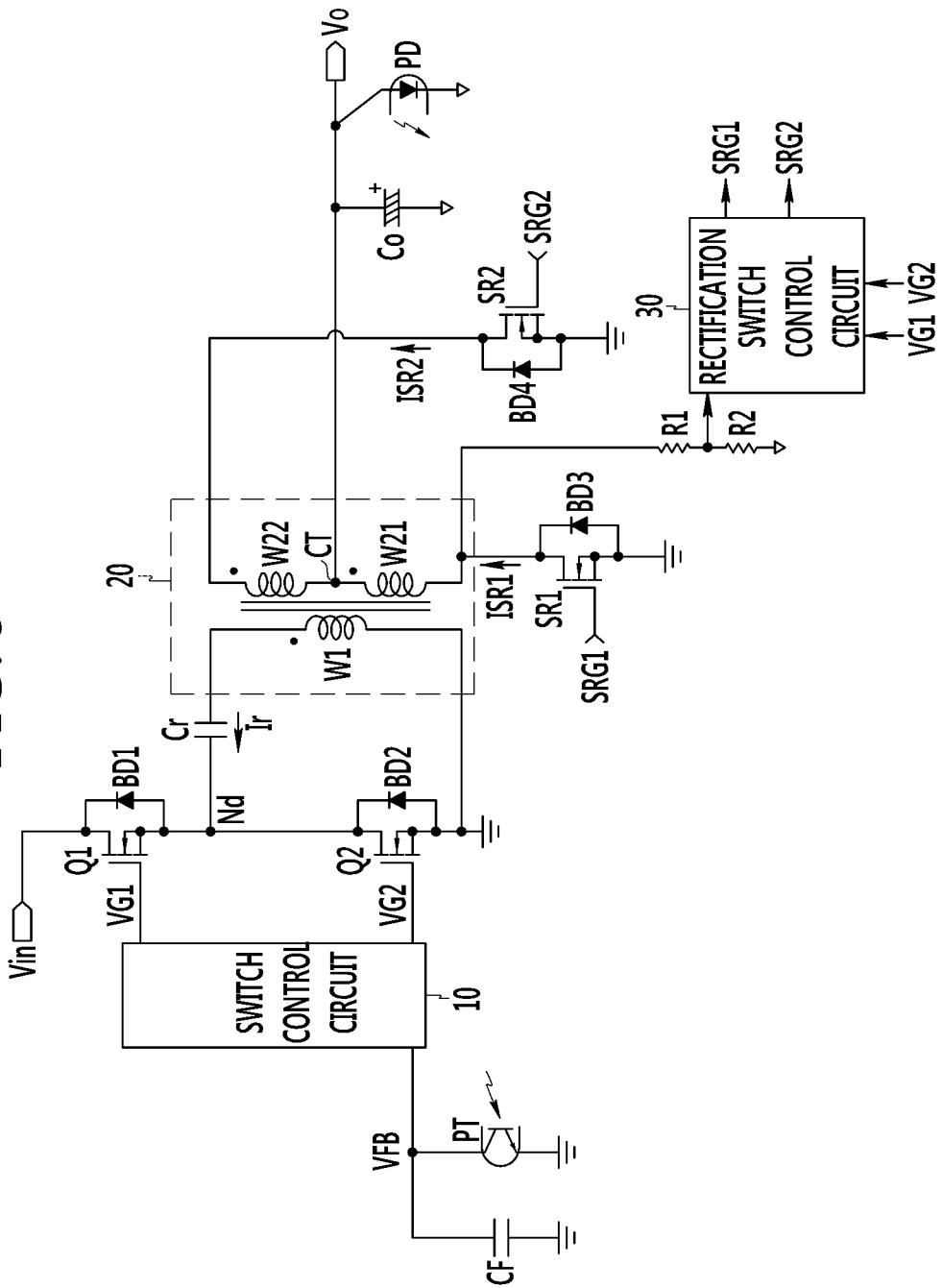
FIG. 3 illustrates an example control circuit of a power supply according to an embodiment.

FIG. 3 illustrates a control circuit of a power supply according to an embodiment. Like elements or operations that are already explained above with reference to FIGS. 1 and 2 will be omitted for the sake of brevity. The switch control circuit 10 may receive feedback information about output voltage Vo, determine switching frequency, and generate a first gate voltage VG1 and a second gate voltage VG2. The diode PD and the transistor PT may form an opto-coupler. The diode PD may illuminate as the current flows to the diode PD according to the output voltage Vo, and current may flow into the transistor PT according to luminosity of the diode PD to thus control the feedback voltage VFB. The switch control circuit 10 may determine switching frequency according to the feedback voltage VFB, and may generate first and second gate voltages VG1, VG2 to switch the first and second switches Q1, Q2, alternately. When the output voltage Vo decreases in accordance with increasing loads, and thus the feedback voltage VFB increases, the switch control circuit 10 may decrease switching frequency to thus increase energy to the secondary side. In the opposite example, the switch control circuit 10 may increase switching frequency, thus reducing energy to the secondary side.

The rectification switch control circuit 30 may receive the first and second gate voltages VG1, VG2 and detection voltage VD, and may generate a first synchronous gate voltage SRG1 and a second synchronous gate voltage SRG2. With the first switch Q1 in ON condition, the rectification switch control circuit 30 may generate an enable level of the first synchronous gate voltage SRG1 to turn on the first synchronous rectification transistor SR1 when the detection voltage VD rapidly falls in accordance with the conduction of the body diode BD3. The rectification switch control circuit 30 may generate an enable level of the first synchronous gate voltage SRG1 to turn on the first synchronous rectification transistor SR1 when the first switch Q1 is turned on (below resonance)

after rapid fall of the detection voltage VD. The rectification switch control circuit 30 may generate a disable level of a first synchronous gate voltage SRG1 to turn off the first synchronous rectification transistor SR1, when a preset ON interval elapses from the turn-on time. With the second switch Q2 in ON condition, the rectification switch may control circuit 30 to generate an enable level of second synchronous gate voltage SRG2 to turn on the second synchronous rectification transistor SR2, when the detection voltage VD rapidly rises in accordance with blocking of the body diode BD3. The rectification switch control circuit 30 may generate an enable level of second synchronous gate voltage SRG2 to turn on the second synchronous rectification transistor SR2 when the second switch Q2 is turned on (below resonance) after rapid rise of the detection voltage VD. The rectification switch control circuit 30 may generate a disable level of a second synchronous gate voltage SRG2 to turn off the second synchronous rectification transistor SR2, when a preset ON interval elapses from the turn-on time. The rectification switch control circuit 30 may include the conduction detection circuit 100 illustrated, for example, in FIG. 2. The rectification switch control circuit 30 may count first and second synchronous rectification conduction intervals at every switching period of the first and second synchronous rectification transistors SR1, SR2, using the first and second OFF signals SRF1, SRF2 and first and second gate voltages VG1, VG2, respectively. The rectification switch control circuit 30 may set an ON interval of the first and second synchronous rectification transistors in the current switching interval based on, for example, the result of subtracting a predetermined time from the first and second synchronous rectification conduction intervals as counted in the immediately-preceding switching period.

Figure 4:
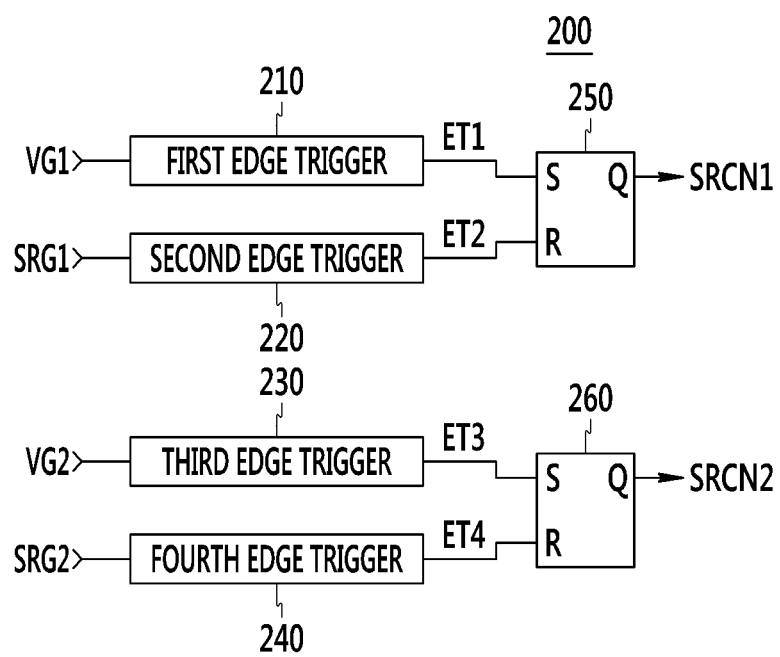
FIG. 4 illustrates an example circuit for detecting a first synchronous rectification conduction interval and a second synchronous rectification conduction interval of a rectification switch control circuit.

FIG. 4 illustrates a circuit to detect first and second synchronous rectification conduction intervals of a rectification switch control circuit. The conduction interval detection circuit 200 may comprise an edge trigger 200 including first to fourth edge triggers 210-240, and two SR flip-flops 250, 260. The first edge trigger 210, in synchronization with a rising edge of the input signal (e.g., first gate voltage VG1), may generate a high level of first edge pulse ET1. The second edge trigger 220, in synchronization with a rising edge of an input signal (e.g., first OFF signal SRF1), may generate a high level of second edge pulse ET2. The third edge trigger 230, in synchronization with a rising edge of the input signal (e.g., second gate voltage VG2), may generate a high level of third edge pulse ET3. The fourth edge trigger 240, in synchronization with a rising edge of an input signal (e.g., second OFF signal SRF2), may generate a high level of fourth edge pulse ET4. The high level pulse widths of the first to fourth edge pulses ET1-ET4 may vary, depending on designs.

The SR flip-flop 250 may include a set S to receive a first edge pulse ET1, a reset R to receive a second edge pulse ET2 and an output Q. The SR flip-flop 250 may output a high level of first synchronous rectification conduction signal SRCN1 through the output Q when the input to the set S rises to a high level. The SR flip-flop 250 may output a low level of a first synchronous rectification conduction signal SRCN1 through the output Q, when the input to the reset R rises to a high level. When the first gate voltage VG1 rises, the first synchronous rectification conduction signal SRCN1 rises to a high level, while when the first OFF signal SRF1 rises, the first synchronous rectification conduction signal SRCN1 decreases to a low level. The SR flip-flop 260 may include a set S to receive a third edge pulse ET3, a reset R to receive a fourth edge pulse ET4 and an output Q. The SR flip-flop 260 may output a high level of a second synchronous rectification conduction signal SRCN2 through the output Q when the input to the set S rises to a high level. The SR flip-flop 260 may output a low level of a second synchronous rectification conduction signal SRCN2 through the output Q when the input to the reset R rises to a high level. When the second gate voltage VG2 rises, the second synchronous rectification conduction signal SRCN2 may rise to a high level. When the second OFF signal SRF2 rises, the second synchronous rectification conduction signal SRCN2 may decrease to a low level.

Figure 5:
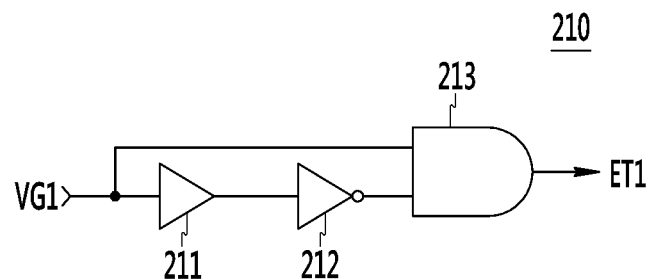
FIG. 5 illustrates an example edge trigger.

FIG. 5 illustrates an example edge trigger. More specifically, FIG. 5 illustrates the first edge trigger 210, and the second to fourth edge triggers 220-240 may have the same or a similar structure as the first edge trigger 210. The first edge trigger 210 may include a delayer 211, an inverter 212 and a logic gate 213. The delayer 211 may delay the input signal (i.e., first gate voltage VG1) for a predetermined time interval before outputting the same. The delay at the delayer 211 may determine high level pulse widths of the first to fourth edge pulses ET1-ET4. The inverter 212 may invert the output from the delayer 211. The logic gate 213 may perform an AND operation of the first gate voltage VG1 and the output from the inverter 212 to thus generate first edge signal ET1.

Figure 6:
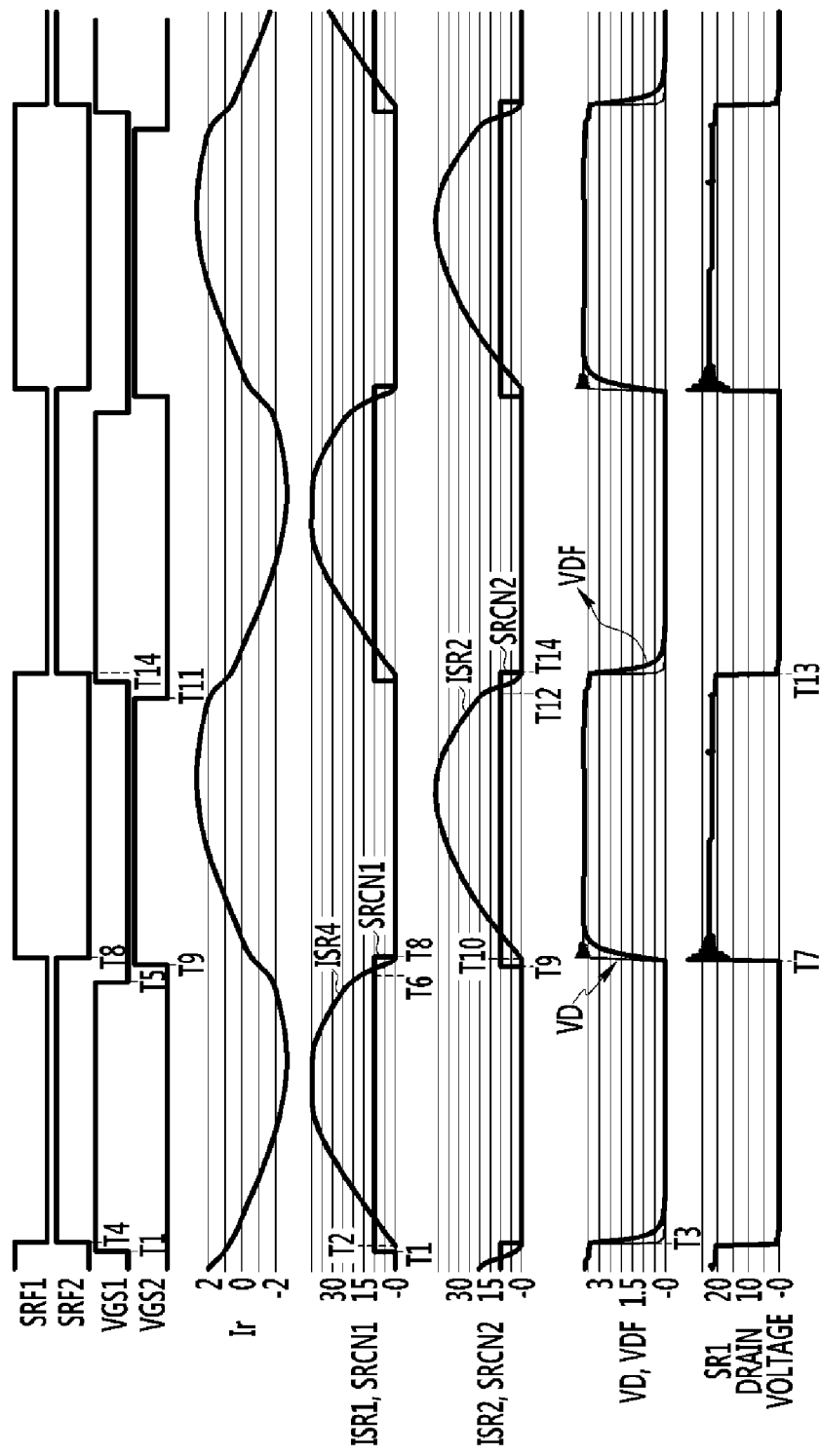
FIG. 6 shows example waveforms of signals according to an embodiment when a primary switching frequency is above resonance.
Figure 7:
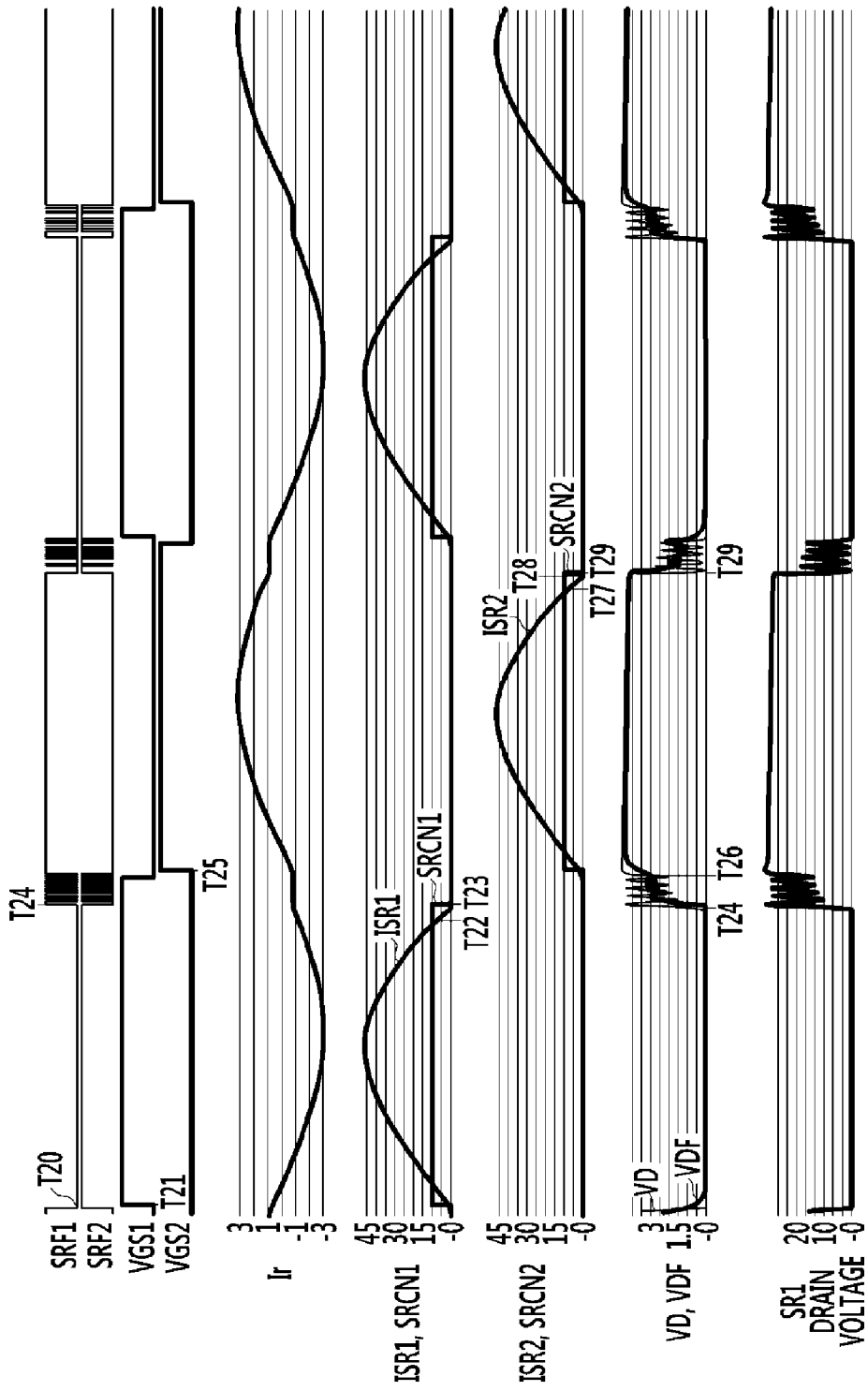
FIG. 7 shows example waveforms of signals according to an embodiment when a primary switching frequency is below resonance.

Referring to FIGS. 6 and 7, a method for measuring synchronous rectification conduction interval according to an embodiment will be explained. In FIGS. 6 and 7, waveform of the detection voltage VD is expressed in a thinner curve than the filtered voltage VDF for better recognition.

FIG. 6 shows example waveforms of signals when the primary side switching frequency is above resonance. At time point T1, the first gate voltage VGS1 rises to a high level and the first switch Q1 turns on. According to resonance, current Ir flows to the primary side winding W1 via the first switch Q1. With the current Ir in a direction as indicated by the arrow in FIG. 3, the current Ir may decrease along the sine wave for the turn-on duration of the first switch Q1 and may then rise. At T1, the first edge signal ET1 becomes high level pulse, so that the first synchronous rectification conduction signal SRCN1 rises to a high level. At T2, the secondary side body diode BD3 is conducting with the primary side current Ir so that the current ISR1 begins to flow. After the body diode BD3 starts conducting, the drain voltage of the first synchronous rectification transistor SR1 rapidly falls. Accordingly, the detection voltage VD rapidly falls at T2 along with the filtered voltage VDF that falls with a gentler slope as compared to the detection voltage VD. At T3, the second synchronous rectification conduction signal SRCN2 falls to a low level and the first synchronous rectification transistor SR1 turns on, so that the current ISR1 flows through the first synchronous rectification transistor SR1.

At T4, the first comparison signal S1 becomes high level, the output signal S4 becomes low level, and the inverted output signal S5 becomes high level. The first OFF signal SRF1 then becomes low level and the second OFF signal SRF2 becomes high level. At T5, the first gate voltage VGS1 falls to a low level and at T6 the first synchronous rectification transistor SR1 turns off. The ON interval between T3 and T6 may be set according to the result of subtracting a predetermined period from the conduction interval (e.g., SRCN1 high level interval) in the immediately-preceding switching period of the first synchronous rectification transistor SR1. After T6, the current ISR1 flows through the body diode BD3. At T7, the body diode BD3 blocks the inverted current, causing the voltage on both ends to rapidly increase and the drain voltage of the first synchronous rectification transistor SR1 rapidly increases. Accordingly, the detection voltage VD also rapidly increases, while the filtered voltage VDF rises on a relatively gentle slope as compared to the detection voltage VD. At T8, the second comparison signal S2 becomes high level, the output signal S4 becomes high level, and the inverted output signal S5 becomes low level. The first OFF signal SRF1 then becomes high level and the second OFF signal SRF2 becomes low level. As the second edge signal ET2 becomes high level pulse at T8, the first synchronous rectification conduction signal SRCN1 decreases to low level.

As previously explained, it may be possible to detect the conduction period of the body diode BD3 using the first gate voltage VG1, the drain voltage of the first synchronous rectification transistor SR1 and the filtered voltage of the drain voltage, and to control the ON period of the first synchronous rectification transistor SR1 according to the detected conduction period. At T9, the second gate voltage VGS2 rises to high level, and the second switch Q2 turns on. According to resonance, the current Ir flows to the primary side winding W1 via the second switch Q2. During the turn-on period of the second switch Q2, the current Ir is in such a pattern that the current Ir rises along the sine wave and then decreases. At T9, the third edge signal ET3 becomes high level pulse so that the second synchronous rectification conduction signal SRCN2 rises to a high level. At T10, the primary side current Ir is conducted through the secondary side body diode BD4 so that the current ISR2 begins to flow. The body diode BD4 conducting may cause the drain voltage of the second synchronous rectification transistor SR2 to fall rapidly. The second synchronous rectification transistor SR2 turns on at T8 when the first synchronous rectification conduction signal SRCN1 decreases to a low level. Accordingly, the current ISR2 flows through the second synchronous rectification transistor SR2 since T8. T8 refers to a time point later than T10.

In embodiments consistent with the present disclosure, the conduction detection circuit may detect the drain voltage of only the first synchronous rectification transistor SR1 of the two synchronous rectification transistors SR1, SR2, and the rectification switch control circuit 30 may predict the drain voltage of the second synchronous rectification transistor SR2 by flipping the drain voltage as detected. Referring to FIG. 6, considering that the drain voltage of the first synchronous rectification transistor SR1 rapidly increases at T7, it is predictable that the drain voltage of the second synchronous rectification transistor SR2 would rapidly fall. At T8, which is substantially the same point in time as T7, the second synchronous rectification transistor SR2 turns on, allowing the current ISR2 to flow through the second synchronous rectification transistor SR2.

At T11, the second gate voltage VGS2 falls to a low level and the second synchronous rectification transistor SR2 turns off at T12. The ON interval between T9 and T12 is set, based on the result of subtracting a predetermined period from the conduction interval (e.g., SRCN2 high level period) of the immediately-preceding switching period of the second synchronous rectification transistor SR2. After T12, the current ISR2 flows through the body diode BD4. Considering the fact that the drain voltage of the first synchronous rectification transistor SR1 rapidly falls at T13, it is predictable that the drain voltage of the second synchronous rectification transistor SR2, which may exhibit inverse behavior to the drain voltage of the first synchronous rectification transistor SR1, would rapidly rise. That is, it is predictable that at T13 the body diode BD4 blocks the inverted current ISR2, causing voltages on both ends to rise. At T13, the drain voltage of the first synchronous rectification transistor SR1 rapidly falls, which may be accompanied with the rapid fall of the detection voltage VD. The filtered voltage VDF may decrease on a relatively gentler slope compared to the detection voltage VD. At T14, the first comparison signal S1 becomes high level, the output signal S4 becomes low level and the inverted output signal S5 becomes high level. Accordingly, the first OFF signal SRF1 becomes low level and the second OFF signal SRF2 becomes high level. At T14, the fourth edge signal ET4 becomes high level pulse, the second synchronous rectification conduction signal SRCN2 falls to a low level and the first synchronous rectification transistor SR1 turns on. T13 and T14 may be substantially identical points in time.

As previously explained, it may be possible to detect the conduction period of the body diode BD4 using the second gate voltage VG2, the drain voltage of the first synchronous rectification transistor SR1 and the filtered drain voltage, and to control the ON period of the second synchronous rectification transistor SR2 according to the conduction period as detected.

FIG. 7 shows example waveforms of signals when the primary side switching frequency is below resonance according to the embodiments. As the secondary side body diode BD3 conducts the primary side current Ir before T20, current ISR1 begins to flow. Based on body diode BD3 conducting, the drain voltage of the first synchronous rectification transistor SR1 rapidly falls, which may be accompanied by the rapid fall of the detection voltage VD and the filtered voltage VDF, which may fall on a relatively gentler slope as compared to the detection voltage VD. At T20, the first comparison signal S1 becomes high level, the output signal S4 becomes low level and the inverted output signal S5 becomes high level. Accordingly, the first OFF signal SRF1 becomes low level and the second OFF signal SRF2 becomes high level. According to the rising edge of the second OFF signal SRF2, the second synchronous rectification conduction signal SRCN2 falls to a low level. At T21, the first gate voltage VGS1 rises to a high level, the first switch Q1 turns on and according to resonance, the current Ir flows to the primary side winding W1 through the first switch Q1. At T21, the first synchronous rectification transistor SR1 turns on. During the turn-on period of the first switch Q1, the current Ir is in such a pattern that the current Ir falls along with the sine wave and then rises. At T21, the first edge signal ET1 becomes high level pulse, so that the first synchronous rectification conduction signal SRCN1 rises to a high level. After T21, the current ISR1 flows through the first synchronous rectification transistor SR1. At T22, the first synchronous rectification transistor SR1 turns off. The turn-on period between T21 and T22 may be set based on the result of subtracting a predetermined period from the conduction interval (e.g., SRCN1 high level period) of the immediately-preceding switching period of the first synchronous rectification transistor SR1. After T22, the current ISR1 flows through the body diode BD3. The body diode BD3 is blocked when the current ISR1 goes to zero current at T23, and noise occurs in the current ISR1 and the drain detection voltage VD of the first synchronous rectification transistor SR1 since T24 for a predetermined time (e.g., T24-T26) due to parasitic capacitance. The noise is reflected on the detection voltage VD. Because the filtered voltage VDF follows a rising waveform through low-pass filtering, the first OFF signal SR1 is in a waveform with high and low levels due to the noise of the detection voltage VD. As the second comparison signal S2 becomes high level at T24, which is the initial time point of rapid rise of the detection voltage VD, the output signal S4 becomes high level and the inverted output signal S5 becomes low level. Accordingly, the first OFF signal SRF1 becomes low level, and the second OFF signal SRF2 becomes low level. At T24, the second edge signal ET2 becomes high level pulse and the first synchronous rectification conduction signal (SRCN1) falls to a low level. As previously explained, it may be possible to detect the conduction period of the body diode BD3 using the first gate voltage VG1, the drain voltage of the first synchronous rectification transistor SR1 and the filtered drain voltage, and to control the ON period of the first synchronous rectification transistor SR1 according to the conduction period as detected. At T25, the second gate voltage VGS2 rises to a high level, the second switch Q2 turns on and, according to resonance, the current Ir flows to the primary side winding W1 through the second switch Q2. At T25, the second synchronous rectification transistor (SR2) turns ON. During the turn-on period of the second switch Q2, the current Ir is in such a pattern that the current Ir rises along with the sine wave and then falls. At T25, the third edge signal ET3 becomes high level pulse, so that the second synchronous rectification conduction signal SRCN2 rises to a high level. After T25, current ISR2 flows through the second synchronous rectification transistor SR2. As the primary side current Ir is conducted by the secondary side body diode BD4 before T25, the current ISR2 begins to flow. Based on the body diode BD4 conducting, the drain voltage of the second synchronous rectification transistor SR2 rapidly falls, which is accompanied with the rapid fall of the detection voltage VD and the filtered voltage VDF, which falls on a relatively gentler slope as compared to the detection voltage VD.

Referring to FIG. 7, considering that the drain voltage of the first synchronous rectification transistor SR1 repeats its rises and falls due to noise after a rapid rise at T24, it is predictable that the drain voltage of the secondary synchronous rectification transistor SR2 would rapidly fall and repeat its rises and falls afterward. Because the filtered voltage VDF follows a rising waveform by the low-pass filtering during the noise period T24-T26, the waveform of the second OFF signal SR2 includes high and low levels due to the noise of the detection voltage VD. Considering that the drain detection voltage VD maintains a high level after T26, which is the end of the noise generating period, the drain voltage of the second synchronous rectification transistor SR2 is predicted to be maintained at a low level. The first OFF Signal SRF1 maintains a high level from T26, and the second OFF signal SRF2 maintains a low level. At T27, the second synchronous rectification transistor SR2 turns off. The turn-on period between T25 and T27 may be set based on the result of subtracting a predetermined period from the conduction interval (e.g., SRCN2 high level period) of the immediately-preceding switching period of the second synchronous rectification transistor SR2. After T27, the current ISR2 flows through the body diode BD4. The body diode BD4 is blocked when the current ISR2 becomes zero current at T28, and noise may occur in the current ISR2 and the drain detection voltage of the second synchronous rectification transistor SR2 since T28 for a predetermined time due to parasitic capacitance.

As illustrated in FIG. 7, noise may be generated in the drain detection voltage VD due to parasitic capacitance. In one embodiment, it is possible to predict that noise would be generated in the drain voltage of the second synchronous rectification transistor SR2, using the detection voltage VD. Because the filtered voltage VDF is in a falling waveform due to low-pass filtering, the second OFF signal SR2 is in such a waveform with high and low levels due to the noise of the detection voltage VD. At this time, as the first comparison signal S1 becomes high level at an initial time point (i.e., T29) of rapid fall of the detection voltage VD, the output signal S4 becomes low level, and the inverted output signal S5 becomes high level. Accordingly, the first OFF signal SRF1 becomes low level, and the second OFF signal SRF2 becomes high level. At T29, the fourth edge signal ET2 becomes high level pulse and the second synchronous rectification conduction signal SRCN2 falls to low level.

As explained, it may be possible to detect the conduction period of the body diode BD4 using the second gate voltage VG2, the drain voltage of the second synchronous rectification transistor SR2 and the filtered drain voltage, and to control the ON period of the second synchronous rectification transistor SR2 according to the conduction period as detected.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

DESCRIPTION OF SYMBOLS

1: power supply
Q1: first switch
Q2: second switch
30: gate drive circuit
SR1: first synchronous rectification transistor
SR2: second synchronous rectification transistor
10: switch control circuit
20: transformer
30: rectification switch control circuit
100: conduction detection circuit
110: low-pass filter
120-140: first to third comparators
150, 250, 260: SR flip-flops
160: first logic gate
170: second logic gate
180, 212: inverter
200: conduction period detection circuit
300: edge trigger
210-240: first to fourth edge triggers
211: delayer
213: logic gate
R1-R3: resistors
C1, Cr, CF, Co: capacitors
BD1-BD4: body diodes

What is claimed:

1. A conduction detecting circuit configured to detect conduction of a first body diode connected in parallel to a first synchronous rectification transistor which is connected to one end of a first winding, and a second body diode connected in parallel to a second synchronous rectification transistor which is connected to one end of a second winding, respectively, the circuit comprising:
a low-pass filter configured to generate filtered voltage by filtering a detection voltage based on a drain voltage of the first synchronous rectification transistor;
a first comparator configured to detect a time point at which the detection voltage decreases to be lower than the filtered voltage by at least a first reference voltage; and
a second comparator configured to detect a time point at which the detection voltage increases to be higher than the filtered voltage by at least a second reference voltage,
wherein a time point of ending a first synchronous rectification conduction interval of the first body diode and a time point of ending a second synchronous rectification conduction interval of the second body diode are detected by the conduction detecting circuit according to outputs from the first and second comparators.

2. The conduction detection circuit of claim 1, wherein the time point of ending the first synchronous rectification conduction interval is determined based on the output from the second comparator when the detection voltage is higher than the filtered voltage by at least the second reference voltage.

3. The conduction detection circuit of claim 1, wherein the time point of ending the second synchronous rectification conduction interval is determined based on the output from the first comparator when the detection voltage is lower than the filtered voltage by at least the first reference voltage.

4. The conduction detection circuit of claim 1, further comprising a third comparator configured to determine whether the detection voltage is higher than a predetermined reference voltage.

5. The conduction detection circuit of claim 1, further comprising an SR flip-flop configured to generate an enable level of output signal according to the output from the second comparator, and generate an enable level of an inverted output signal according to the output from the first comparator.

6. The conduction detection circuit of claim 5, further comprising a first logic operator configured to generate a first OFF signal, indicating the time point of ending the first synchronous rectification conduction interval according to the output signal from the SR flip-flop, when the detection voltage is higher than a predetermined reference voltage.

7. The conduction detection circuit of claim 6, further comprising a second logic operator configured to generate a second OFF signal, indicating the time point of ending the second synchronous rectification conduction interval according to the inverted output signal from the SR flip-flop and an inverted signal of the first OFF signal.

8. The conduction detection circuit of claim 1, wherein the low-pass filter comprises:
 a resistor comprising an end configured to receive the detection voltage; and
 a capacitor connected to the resistor, wherein the filtered voltage is a voltage from where the resistor connects to the capacitor.

9. A rectification switch control circuit configured to control a switching operation of a first synchronous rectification transistor and a second synchronous rectification transistor connected in parallel to a first body diode and a second body diode, respectively, which conduct according to a resonance current under control of a switching operation of a first switch and a second switch, the rectification switch control circuit comprising:
 a conduction detection circuit configured to detect a time point of ending a first synchronous rectification conduction interval of the first body diode and a time point of ending a second synchronous rectification conduction interval of the second body diode based on a detection voltage corresponding to a drain voltage of the first synchronous rectification transistor and a filtered voltage generated by a low-pass filter; and
 an edge trigger configured to generate a first edge signal at a turn-on time of the first switch and generate a second edge signal at a turn-on time of the second switch, wherein a time point of beginning the first synchronous rectification conduction interval is in synchronization with the first edge signal, and a time point of beginning the second synchronous rectification conduction interval is in synchronization with the second edge signal.

10. The rectification switch control circuit of claim 9, wherein the control circuit turns on the first synchronous rectification transistor when the first switch turns on and the detection voltage is rapidly falling, and turns off the first synchronous rectification transistor when a predetermined ON period elapses from the turn-on time, and sets the predetermined ON period based on a result of subtracting a predetermined period from the first synchronous rectification conduction interval in an immediately-preceding switching period of the first synchronous rectification transistor.

11. The rectification switch control circuit of claim 9, wherein the control circuit turns on the second synchronous rectification transistor when the second switch turns on and the detection voltage is rapidly rising, and turns off the second synchronous rectification transistor when a predetermined ON period elapses from the turn-on time, and sets the predetermined ON period based on a result of subtracting a predetermined period from the second synchronous rectification conduction interval in an immediately-preceding switching period of the second synchronous rectification transistor.

12. The rectification switch control circuit of claim 9, wherein the conduction detection circuit determines a time point of ending the second synchronous rectification conduction interval when the detection voltage is lower than the filtered voltage by at least a first reference voltage, and determines a time point of ending the first synchronous rectification conduction interval when the detection voltage is higher than the filtered voltage by at least a second reference voltage.

13. The rectification switch control circuit of claim 12, wherein the conduction detection circuit comprises:
 a first comparator configured to determine if the detection voltage is lower than the filtered voltage by at least the first reference voltage;
 a second comparator configured to determine if the detection voltage is higher than the filtered voltage by at least the second reference voltage;
 an SR flip-flop configured to generate an enable level of output signal according to an output from the second comparator and generates an enable level of inverted output signal according to an output from the first comparator and to generate a first OFF signal, indicating a time point of ending the first synchronous rectification conduction interval according to an output signal from the SR flip-flop, and to generate a second OFF signal, indicating a time point of ending the second synchronous rectification conduction interval according to an inverted signal of the first OFF signal and an inverted output signal from the SR flip-flop.

14. The rectification switch control circuit of claim 9, wherein the edge trigger in synchronization with the time point of ending the first synchronous rectification conduction interval generates a third edge signal, and the edge trigger in synchronization with the time point of ending the second synchronous rectification conduction interval generates a fourth edge signal.

15. The rectification switch control circuit of claim 14, further comprising:
 a first SR flip-flop configured to generate an enable level of first synchronous rectification conduction signal according to the first edge signal and generate a disable level of first synchronous rectification conduction signal according to the third edge signal; and
 a second SR flip-flop configured to generate an enable level of second synchronous rectification conduction signal according to the second edge signal and generate a disable level of second synchronous rectification conduction signal according to the fourth edge signal.

16. The rectification switch control circuit of claim 15, wherein the control circuit counts the first and second synchronous rectification conduction intervals using the first and second synchronous rectification conduction signals, respectively.

17. The rectification switch control circuit of claim 9, wherein the edge trigger comprises:
- a delayer configured to delay an input signal for a predetermined delay time before outputting the same;
- an inverter configured to invert an output from the delayer; and
- an AND gate configured to perform the AND operation of the input signal and an output from the inverter, wherein the input signal is a gate voltage of the first switch or a gate voltage of the second switch.

18. A power supply, comprising:
- a first switch;
- a second switch connected to one end of the first switch;
- a primary side winding connected to one end of the first switch;
- a first body diode connected to one end of a first winding of a secondary side;
- a second body diode connected to one end of a second winding having a second end is connected to a second end of the first winding of the secondary side;
- a first synchronous rectification transistor connected in parallel to the first body diode; and
- a second synchronous rectification transistor connected in parallel to the second body diode, wherein a time point of ending the first synchronous rectification conduction interval of the first body diode and a time point of ending the second synchronous rectification conduction interval of the second body diode are detected using a detection voltage corresponding to the drain voltage of the first synchronous rectification transistor and a filtered voltage generated by a low-pass filter.

19. The power supply of claim 18, wherein a time point of beginning the first synchronous rectification conduction interval is in synchronization with the turn-on time of the first switch, and a time point of beginning the second synchronous rectification conduction interval is in synchronization with the turn-on time of the second switch.

20. The power supply of claim 18, wherein a time point of ending the second synchronous rectification conduction interval is determined when the detection voltage is lower than the filtered voltage by at least a first reference voltage, and a time point of ending the first synchronous rectification conduction interval is determined when the detection voltage is higher than the filtered voltage by at least a second reference voltage.

* * * * *